Feb. 8, 1972        A. H. DE ROOIJ        3,641,150
CYCLIC PROCESS FOR THE PREPARATION OF AN OXIME FROM
A HYDROXYLAMMONIUM SALT SOLUTION
Filed Nov. 12, 1969
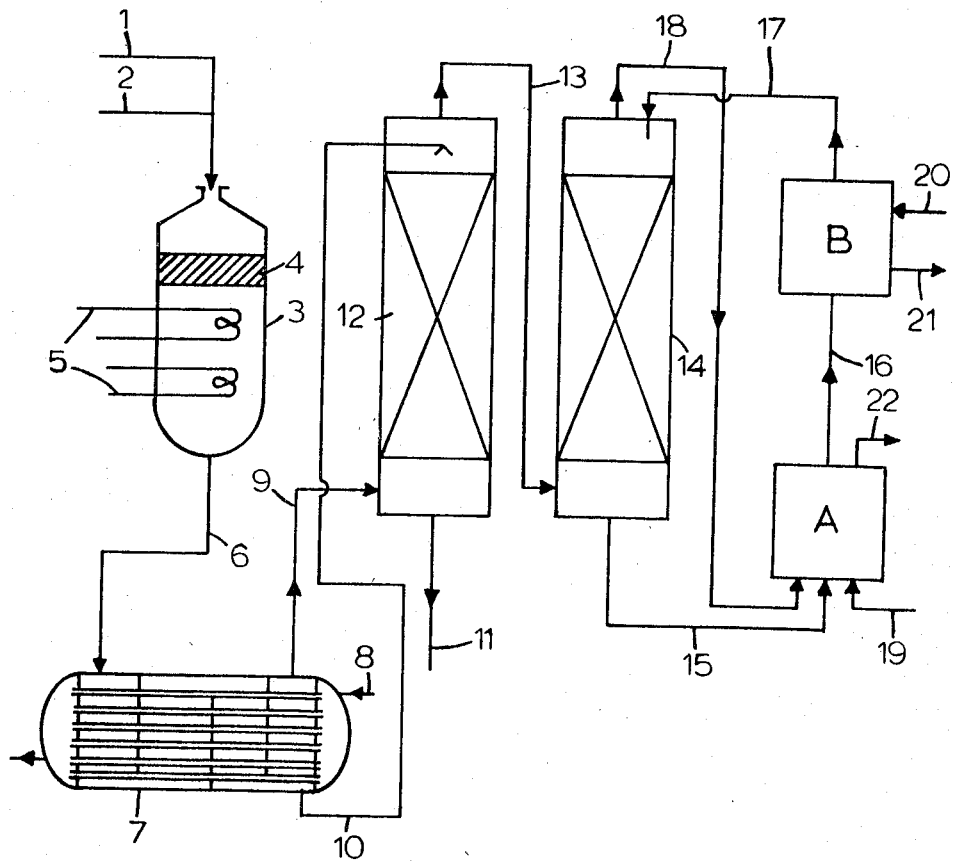
INVENTOR
ABRAHAM H. de ROOIJ
BY Cushman, Darby & Cushman
ATTORNEYS

United States Patent Office 3,641,150
Patented Feb. 8, 1972

3,641,150
CYCLIC PROCESS FOR THE PREPARATION OF AN OXIME FROM A HYDROXYLAMMONIUM SALT SOLUTION
Abraham H. de Rooij, Geleen, Netherlands, assignor to Stamicarbon N.V., Heerlen, Netherlands
Filed Nov. 12, 1969, Ser. No. 875,725
Claims priority, application Netherlands, Nov. 12, 1968, 6816076
Int. Cl. C07c *131/00;* C01b *21/20;* C01c *1/00*
U.S. Cl. 260—566 A            2 Claims

ABSTRACT OF THE DISCLOSURE

A cyclic process in which an aqueous acid reaction medium is kept in circulation between a zone for the synthesis of hydroxylamine and a zone for the synthesis of oxime. A gas flow containing NO and some $NO_2$ is continuously added to the circulating liquid, the greater part of the NO is being catalytically reduced with $H_2$ to form $NH_2OH$ and some $NH_3$ as byproduct. The $NH_2OH$ is consumed in the oxime synthesis zone and the $NH_3$ byproduct is continuously removed by contacting the circulating liquid with NO and $NO_2$ under such conditions that $N_2$ and $H_2O$ result.

---

The present invention relates to an improvement in a cyclic process for the preparation and processing of a hydroxylammonium salt solution.

As is known, an important use to which hydroxylammonium salts are put is the preparation of oximes from ketones, in particular the preparation of cyclohexanone oxime from cyclohexanone. In a known cyclic process for such a preparation an aqueous acid reaction medium—containing buffer acids, e.g. phosphoric acid, or salts that can be considered as acids, e.g. bisulphate, and salts derived from these acids—is kept in circulation through a zone for the synthesis of a hydroxylammonium salt, in which nitrogen monoxide is catalytically reduced to hydroxylamine by means of molecular $H_2$, and reaction zone wherein oxime is formed. In the first zone the resulting hydroxylamine combines with free buffer acid present to form the corresponding hydroxylammonium salt, and the solution then resulting, which contains hydroxylammonium salt, is fed into the oxime-forming zone, where the hydroxylammonium salt reacts with, for instance, a ketone, to form the corresponding oxime and free acid. After the oxime has been removed from the aqueous reaction medium, the latter is returned to the zone in which hydroxylammonium salt is synthetized.

In known processes, the nitrogen monoxide to be fed into the zone for the synthesis of hydroxylammonium salt is obtained by combustion of ammonia; this combustion is effected under such conditions that only a small amount of nitrogen dioxide is formed. Moreover, this nitrogen dioxide is removed by means of a washing with a dilute aqueous nitric acid solution followed by a washing with lye, so that ultimately there results a gaseous nitrogen monoxide free of $NO_2$ and having an NO content of 95%, the balance being accounted for by nitrogen and nitrous oxide (see, for instance, U.S. Pats. No. 3,110,563 and 3,313,595).

The chemical reactions taking place in the successive process stages can be depicted by the following equations, which represent an example:

(1) formation of hydroxylammonium salt $$H_3PO_4 + NO + 1\tfrac{1}{2}\ H_2 \rightarrow NH_3OH^+ + H_2PO_4^-$$

(2) formation of oxime (using e.g. cyclohexanone)

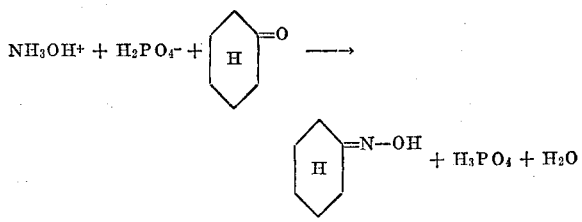

The solution resulting after removal of the oxime—following removal of the water formed in the reaction—in theory has the same composition as the starting solution used for the formation of the hydroxylammonium salt.

However, as is known, the catalytic reduction of nitrogen monoxide by means of molecular hydrogen not only yields hydroxylamine, but also causes about 5 to 20%—depending upon the reaction conditions—of the nitrogen monoxide converted to be reduced to ammonia. A continuous process in which an aqueous acid reaction medium is kept in circulation between a hydroxylamine synthesis zone and an oxime synthesis zone consequently involves the hazard of the reaction medium getting constantly richer in ammonia on account of this nitrogen monoxide reduction.

However, to ensure a proper course of the chemical processes in question it is necessary for the composition of the circulating reaction medium to undergo as little change as possible, which means that measures must be taken to remove the ammonia produced, either at regular intervals or continuously, e.g. by withdrawal of a portion of the circulating reaction medium, followed by evaporation and crystallization of ammonium salt and feedback of the mother liquor after recovery of the ammonium salt.

The process according to the invention relates to an improvement consisting in that the laborious evaporation and removal of crystallized ammonium salt is avoided by—according to the invention—utilizing in this cyclic process the known reaction of nitrous gases with ammonium ions, yielding nitrogen according to the equation:

$$2NH_4^+ + NO + NO_2 \rightarrow 2N_2\uparrow + 3H_2O + 2H^+$$

According to the invention, then, the circulating aqueous reaction medium or a portion of it is contacted with nitrous gases containing nitrogen dioxide by the side of nitrogen monoxide, under such conditions that the ammonium ions to be removed are broken down to nitrogen. The breakdown of $NH_4^+$ to $N_2$ depends more in particular on the temperature. Although it is true that the $NH_4^+$ concentration and the pH also exert an influence on the rate of this breakdown, in an acid reaction medium it is primarily the temperature that is rate-determining. Whereas below 20° C. there is hardly any breakdown, the reaction proceeds at a fast rate already at temperatures in excess of 40° C.

In the cyclic process concerned, which, on the one hand, requires the breakdown to nitrogen of ammonium ions contained in the circulating reaction medium through contact with nitrous gases—a mixture of NO and $NO_2$—and, on the other, demands that NO shall be added to the circulating medium, to serve as a source for the formation of a hydroxylammonium salt, it is advantageous to apply a washing with the reaction medium as the washing liquid for the nitrous gases in the final washing stage, instead of the washing with a solution of lye or sodium carbonate usual in the preparation of a gas stream with a high nitrogen monoxide content and free of nitrogen dioxide.

As is known, in the technical-scale preparation of nitrogen monoxide, a mixture of ammonia, oxygen and steam, or a mixture of ammonia and air is subjected to combustion over a platinum catalyst; the combustion gases give off their heat to a waste-gas heat vessel, converting boiler feed water into steam. Thereafter, the combustion gases are passed to a tubular cooler, in which the gas mixture is cooled down, so far that water vapour condenses; a large portion of the nitrogen dioxide present being dissolved in the condensate and forming dilute nitric acid.

The gases that have become poorer in nitrogen dioxide are next washed in a washing column with the dilute nitric acid thus obtained, which effects a further removal of nitrogen dioxide from the gas mixture. The last remnants of nitrogen dioxide are removed by washing with a (10% by weight) sodium hydroxide solution in a washing column, effecting the removal from the gas of the last traces of nitrogen dioxide and the formation of sodium nitrite, the remaining gas consisting predominantly of nitrogen monoxide, with a balance of nitrogen and nitrous oxide.

According to a preferred embodiment of the invention, the washing with sodium hydroxide in the abovementioned washing process for the removal of nitrogen dioxide from the gas stream mainly consisting of nitrogen monoxide is replaced by a washing with the circulating reaction medium used for the synthesis of the hydroxylammonium salt, in which washing a temperature of at least 40° C. is maintained, and the washing with dilute nitric acid preceding this washing should be so controlled—e.g. via controls of the gas-liquid ratio—that the gas stream resulting after this washing still contains an amount of nitrogen dioxide sufficient to react with the amount of $NH_4^+$ ions to be broken down in the circulating liquid.

In certain cases, when a large amount of $NH_4^+$ ions has to be broken down also this washing with dilute nitric acid may be dropped, since then a gas stream of relatively high $NO_2$ content, i.e. the gas as it leaves the tubular cooler, is needed for the breakdown process.

One mode of carrying out the invention is shown diagrammatically in the figure. The NO preparation is referred to by the ammonia combustion vessel 3 provided with platinum gauze 4 and steam tubes 5, in which the heat released is utilized to produce steam, the hot gas condenser 7, in which the first removal of $NO_2$, with formation of nitric acid, is effected, and a washing column 12.

The cyclic process is referred to by a zone for the synthesis of a hydroxylammonium salt, A, with hydrogen feed through conduit 19, a connecting line 16 to an oximation zone B, in which also the oxime is removed, with a feed line 20 for the ketone to be converted and a discharge line 21 for the oxime, a connecting line 17 to a washing column 14, and a conduit 15 for the feedback of the acid reaction medium now poorer in $NH_4^+$ ions to the hydroxylamine synthesis zone A.

In washing column 14 the reaction medium is contacted with a gas mixture mainly consisting of NO and containing a certain percentage of $NO_2$, which medium is supplied through conduit 13. The gas stream freed of $NO_2$ leaves the column through connecting line 18 to zone A for the synthesis of the hydroxylammonium salt. Waste gas leaves this synthesis zone through conduit 22.

The process is actually operated for instance in the following way: Through conduits 1 and 2 ammonia and air are supplied—preferably at atmospheric pressure—to combustion vessel 3, there to be burnt with formation of NO and $H_2O$. The hot gases give off heat to the cooling tubes 5 and then flow into the hot gas condenser 7 equipped with cooling tubes, to which condenser cooling water is supplied through conduit 8. The gases, now freed of much water, pass on through conduit 9 and enter washing column 12.

The absorption liquid used is the condensate removed in condenser 7 through conduit 10, which condensate already contains some nitric acid on account of $NO_2$ absorption, and continues its $NO_2$ absorption in washing column 12. The nitric acid solution formed in washing column 12 is discharged through conduit 11.

According to the invention, the gas stream coming from washing column 12, which still contains some $NO_2$—e.g. 1–5% by vol.—is sent through conduit 13 and into washing column 14, where the gases are contacted with the circulating reaction medium containing ammonium ions, which is supplied to the top of the column through conduit 17.

The invention will be elucidated with reference to the following example:

EXAMPLE

By means of equipment as represented in the figure, ammonia was burnt with oxygen in the presence of steam as an inert gaseous diluent, to produce an NO-containing gas mixture which, after having passed through absorption column 12, appeared to have the following composition:

| | Moles |
|---|---|
| NO | 82.5 |
| $NO_2$ | 2.5 |
| $H_2O$ | 2.4 |
| $N_2+N_2O$ | 4.0 |

Through conduit 13 this gas was fed into absorption column 14, where it contacts circulating solution supplied through conduit 17 from oxime synthesis zone B and already freed of oxime, the composition of which solution was:

| | Moles |
|---|---|
| $H_3PO_4$ | 95 |
| $NH_4H_2PO_4$ | 75 |
| $H_2O$ | 1575 |

The temperature in column 14 was 65° C. From the bottom of column 14 a solution that had become poorer in $NH_4^+$ ions and possessed the composition:

| | Moles |
|---|---|
| $H_3PO_4$ | 100 |
| $NH_4H_2PO_4$ | 70 |
| $H_2O$ | 1557 | was discharged through conduit 15, and from the top of the column a gas-mixture practically free of $NO_2$ and having the composition:

| | Moles |
|---|---|
| NO | 80 |
| $H_2O$ | 28 |
| $N_2+N_2O$ | 9 | was discharged through conduit 18, both these streams being fed into zone A for the synthesis of the hydroxylammonium salt.

What is claimed is:

1. In a cyclic process for the preparation of an oxime from the reaction of a ketone and an hydroxylammonium salt in which an aqueous acid reaction medium is circulated between
   a hydroxylammonium salt synthesis zone, wherein nitrogen monoxide is catalytically reduced with molecular hydrogen to form hydroxylamine and by-product ammonium ions, which hydroxylamine reacts with the acid of said aqueous acid reaction medium to form said hydroxylammonium salt; and
   an oxime synthesis zone wherein said hydroxylammonium salt is reacted with said ketone to form said oxime,
the improvement consisting essentially in contacting said aqueous acid reaction medium at a temperature of at least 40° C. with a gaseous mixture comprising
   (a) in major proportion nitrogen monoxide to replenish the nitrogen monoxide reduced in said hydroxylammonium synthesis zone, and
   (b) in minor proportion nitrogen dioxide whereby said by-product ammonium ions are removed from said aqueous acid reaction medium by reacting with said nitrogen oxides to form free nitrogen.

2. In the process of claim 1, the further improvement consisting essentially in providing, in combination with said cyclic process for the preparation of an oxime, a nitrogen monoxide preparation stage comprising the steps of
combustion of ammonia thereby forming a combustion gas comprising nitrogen monoxide and nitrogen dioxide;
washing said combustion gas in a first washing step with a dilute aqueous nitric acid solution resulting in a washed gaseous mixture comprising in major proportion nitrogen monoxide and in minor proportion nitrogen dioxide; and
washing said gaseous mixture in a second washing step with said aqueous acid reaction medium, at a temperature of at least 40° C., whereby said aqueous acid reaction medium is contacted with said gaseous mixture.

References Cited

UNITED STATES PATENTS

| | | | |
|---|---|---|---|
| 2,797,144 | 6/1957 | Joris | 23—190 XA |
| 3,429,920 | 2/1969 | De Rooij | 23—190 X |

EARL C. THOMAS, Primary Examiner

H. S. MILLER, Primary Examiner

U.S. Cl. X.R.

23—103, 157 R, 190 A, 220